(12) United States Patent
Puimedon (10) Patent No.: US 9,762,436 B2
(45) Date of Patent: Sep. 12, 2017

(54) UNIFIED AND PERSISTENT NETWORK CONFIGURATION

(71) Applicant: Red Hat, Inc., Raleigh, NC (US)

(72) Inventor: Antoni Segura Puimedon, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 459 days.

(21) Appl. No.: 14/189,167

(22) Filed: Feb. 25, 2014

(65) Prior Publication Data

US 2015/0244569 A1    Aug. 27, 2015

(51) Int. Cl.
*H04L 12/24* (2006.01)
*G06F 9/445* (2006.01)

(52) U.S. Cl.
CPC ...... *H04L 41/0803* (2013.01); *G06F 9/44505* (2013.01); *G06F 9/44536* (2013.01); *H04L 41/0843* (2013.01); *H04L 41/0859* (2013.01); *H04L 41/0863* (2013.01); *H04L 41/0886* (2013.01)

(58) Field of Classification Search
CPC ..... H04L 12/24; H04L 29/06; H04L 41/0886; H04L 41/0803; H04L 41/0843; H04L 41/0859; H04L 41/0863; G06F 9/44505; G06F 9/44536
See application file for complete search history.

(56) References Cited

U.S. PATENT DOCUMENTS

| | | | | |
|---|---|---|---|---|
| 5,978,813 A * | 11/1999 | Foltz | ................. | G06F 17/30067 |
| 6,075,938 A * | 6/2000 | Bugnion | ................. | G06F 9/544 703/27 |
| 6,457,152 B1 * | 9/2002 | Paley | ................. | H04L 12/2697 714/33 |
| 6,473,794 B1 * | 10/2002 | Guheen | ................. | H04L 41/22 709/223 |
| 6,584,074 B1 * | 6/2003 | Vasamsetti | ................. | H04L 12/5601 370/254 |
| 6,606,744 B1 * | 8/2003 | Mikurak | ................. | H04L 29/06 717/174 |
| 6,763,376 B1 * | 7/2004 | Devine | ................. | G06F 11/0709 379/201.01 |
| 6,854,054 B1 * | 2/2005 | Kavanagh | ................. | G06F 9/4418 711/166 |
| 6,950,833 B2 * | 9/2005 | Costello | ................. | G06F 11/2064 |
| 7,441,108 B2 * | 10/2008 | Fisher | ................. | G06F 9/4443 712/227 |
| 7,502,866 B2 * | 3/2009 | Tarvainen | ................. | H04L 29/12216 709/220 |
| 7,953,832 B2 * | 5/2011 | Richard | ................. | H04L 29/12839 709/222 |

(Continued)

OTHER PUBLICATIONS

Unknown author, Atomicity, Dec. 16, 2013, Wikipedia, 3 Pages.*
Murtaza Mandvil, Atomicity of File.Move, Mar. 7, 2013, Stack Overflow, 2 Pages.*

*Primary Examiner* — Le H Luu
(74) *Attorney, Agent, or Firm* — Lowenstein Sandler LLP (57) ABSTRACT

A system and a method are disclosed to configure networking components, including in response to a first configuration command, creating a running configuration for a host computer, saving the running configuration in a configuration file stored in a temporary directory, and in response to receiving a second configuration command to make the running configuration persistent, copying the configuration file to a persistent directory.

20 Claims, 8 Drawing Sheets

(56) References Cited

U.S. PATENT DOCUMENTS

| | | | |
|---|---|---|---|
| 8,949,312 B2* | 2/2015 | McLoughlin | G06F 8/63 709/203 |
| 2001/0042073 A1* | 11/2001 | Saether | G06F 17/30194 |
| 2002/0055972 A1* | 5/2002 | Weinman, Jr. | G06F 11/2058 709/203 |
| 2002/0077114 A1* | 6/2002 | Isham | H04L 67/36 455/454 |
| 2002/0078233 A1* | 6/2002 | Biliris | H04L 29/06 709/238 |
| 2003/0005273 A1* | 1/2003 | Perycz | H04L 41/0806 713/1 |
| 2003/0037341 A1* | 2/2003 | Van Der Meulen | G08C 17/02 725/143 |
| 2003/0105810 A1* | 6/2003 | McCrory | H04L 29/06 709/203 |
| 2007/0100892 A1* | 5/2007 | Kephart | G06Q 10/06 |
| 2007/0294385 A1* | 12/2007 | Kapadekar | G06F 8/65 709/223 |
| 2008/0126792 A1* | 5/2008 | Herington | G06F 9/45537 713/100 |
| 2008/0140959 A1* | 6/2008 | Popell | G06F 1/1632 711/161 |
| 2008/0222642 A1* | 9/2008 | Kakarla | G06F 9/5077 718/104 |
| 2009/0164769 A1* | 6/2009 | Cherian | G06F 9/4416 713/2 |
| 2010/0040072 A1* | 2/2010 | Kitada | H04L 45/02 370/400 |
| 2010/0107205 A1* | 4/2010 | Foti | H04L 65/4084 725/109 |
| 2010/0306173 A1* | 12/2010 | Frank | G06F 9/45558 707/640 |
| 2010/0306770 A1* | 12/2010 | Frank | G06F 9/45558 718/1 |
| 2012/0297181 A1* | 11/2012 | Lee | G06F 8/68 713/2 |
| 2013/0067448 A1* | 3/2013 | Sannidhanam | G06F 8/60 717/169 |

* cited by examiner

UNIFIED AND PERSISTENT NETWORK CONFIGURATION

TECHNICAL FIELD

The present disclosure relates to network computing, and more specifically to methods and systems to perform network configuration for virtual machines running on host machines.

BACKGROUND

Virtualization in information processing systems allows for multiple instances of one or more operating systems to run on resources (or components) of a hosting computing device ("host" or "host machine"). Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while "host software" is software, such as a VMM, that runs outside of, and may or may not be aware of, the virtualization environment.

VM(s) may run on one or more host machines. Further, each of the VM(s) may run under the control of a respective OS which may or may not be different from the OS of another VM. VM(s) may include virtual network resources such as virtual network interface cards (VNICs). Network resources of the one or more hosts may need to be configured to be used by each of the VM(s). For example, networking components (such as Ethernet port) may be configured with addresses and identifiers so that operating system of the host may know where and how to communicate with the networked devices.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

A computer system (such as a host of virtual machines) may include networking components. In the context of hosts of virtual machines, these networking components may include network interface cards (NICs) and bonds that may aggregate one or more network interface cards to work as a single one. Each networking component may include a set of attributes ("attributes") that may be configured with configuration values ("values") which may be saved in a configuration file at designated directories. The attributes may include addresses and names of the networking components. Thus, the network configuration of a computer system may include a set of configuration files in designated directories from which the computer system may determine how to communicate with other networked devices and network interface cards. Additionally, some networked devices may communicate with the hosts bypassing the network interface cards. The addresses and names of these networked devices may also be stored in configuration files at the designated directories.

When configuring the networking components of hosts, it is first desirable that the network configuration may be restored upon a reboot of the hosts. Further, it is desirable that the process of network configuration is consistent over different types of operating systems so that a user may perform the network configuration in a unified manner.

However, current operating system distributions (such as Linux distributions) do not provide a unified network configuration. For example, previously, some Linux operating systems may rely on initscripts packages to supply network configuration to a host. However, different Linux operating systems may have different initscripts packages. Thus, network configurations using initscripts packages are not a unified approach. Further, the initscripts saves configuration files in a persistent directory. Rollbacks are achieved by backing up files in the persistent directories before each network changes, which is inconvenient. Current network configurators (such as iproute2) replace initscripts packages with an application programming interface (API). However, iproute2 does not store any persistent files to allow a consistent initial network configuration in the event of a host reboot.

Implementations of the disclosure include systems and methods that may provide persistent network configuration through host reboots, rollback mechanisms to roll back any change made in the event that a change to the network (such as addition and deletion of a networking component) fails, and a convenient way to access representations of the current network configurations.

Techniques to configure networks of a computer system (such as a host of virtual machines) are described herein. In the following description, numerous details are set forth to provide a more thorough explanation of the implementations. It will be apparent, however, to one skilled in the art, that implementations of the present invention may be practiced without these specific details. In other instances, well-known structures and devices are shown in block diagram form, rather than in detail, in order to avoid obscuring implementations of the present invention.

Implementations of the disclosure may include a method. The method may include in response to a first configuration command, creating a running configuration for a host computer, saving the running configuration in a configuration file stored in a temporary directory, and in response to receiving a second configuration command to make the running configuration persistent, copying the configuration file to a persistent directory.

Figure 1:
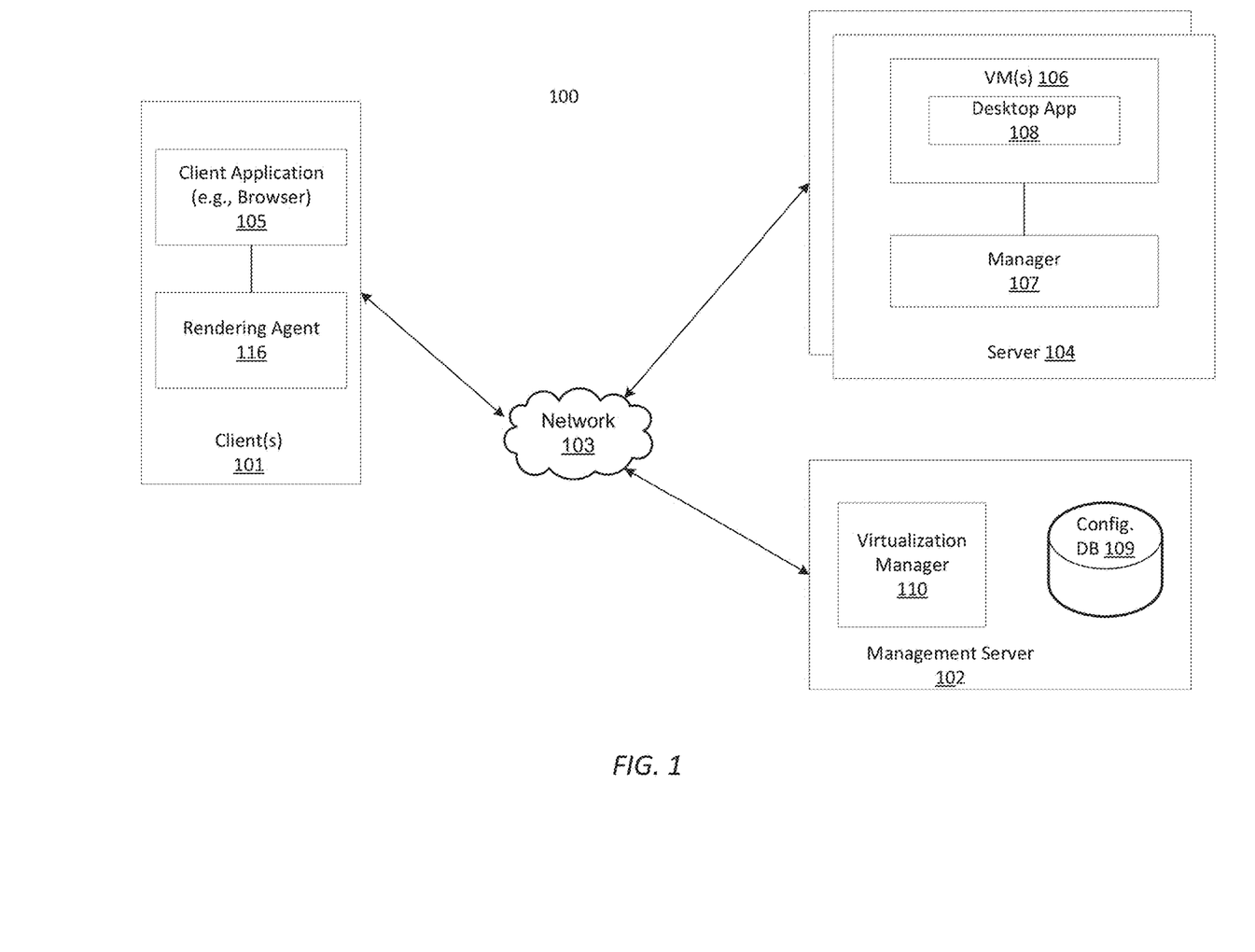
FIG. 1 is a block diagram illustrating a virtualization computing system according to an implementation of the disclosure.

FIG. 1 is a block diagram illustrating a virtualization computing system 100 according to an implementation of the disclosure. Referring to FIG. 1, the system 100 may include, but not be limited to, one or more clients 101 communicatively coupled to a cluster of servers 104 over a network 103. Servers 104 may represent a server. Network 103 may be a local area network (LAN) or a wide area network (WAN) and may be a combination of one or more networks. Client 101 can be any computer system in communication with servers 104 for remote execution of applications.

Generally, a client such as client 101 can be a computer system in communication with server 104 for remote execution of applications at server 104. Thus, input data (e.g., mouse and keyboard input) representing application commands is received at the client and transferred over network 103 to server 104. In response to client side data, an application (e.g., desktop application) can generate output display commands (e.g., graphics commands, simply referred to herein as graphics data), which may include one or more paint and/or draw operations, for example, in the form of executable instructions. The output display commands can then be transmitted (e.g., as graphics update commands) with an optional compression back to the remote client and a remote display driver (e.g., a rendering agent 116) of the remote client can collect the graphics commands and generate corresponding drawing commands for rendering at a display device of the client. Note that a desktop application is utilized herein as an example; however, any other application may also be applied.

In one implementation, server 104 is to host one or more virtual machines 106, each having one or more desktop (or server) applications 108 (e.g., desktop or server operating system). Desktop (or server) application 108 may be executed and hosted by an operating system within virtual machine 106. Such an operating system in virtual machine 106 is also referred to as a guest operating system. Multiple guest operating systems and the associated virtual machines may be controlled by another operating system (also referred to as a host OS). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

Servers 104 may be managed by a management server 102, which may be a separate machine or part of the machine hosting server (e.g., virtual desktop server or VDS). For example, server 104 may be implemented as a VDS server while management server 102 may be implemented as a VDC (virtual desktop control) server.

In one implementation, server 104 may be a member of a cluster of servers, where each of the member servers of the same cluster is coupled to the same network or the same segment of a network, also referred to as a logical network. In one implementations, server 104 may include multiple network interfaces (not shown), which may be coupled to the same or different logical network. Each network interface of server 104 may be configured via management server 102, for example, by an administrator. Server 104 may be configured to be coupled to multiple networks (physical or logical network), such as, for example, a storage network, a virtual local area network (VLAN) for the guests, a management network, and/or a remote display network for remote accesses, etc.

Figure 2:
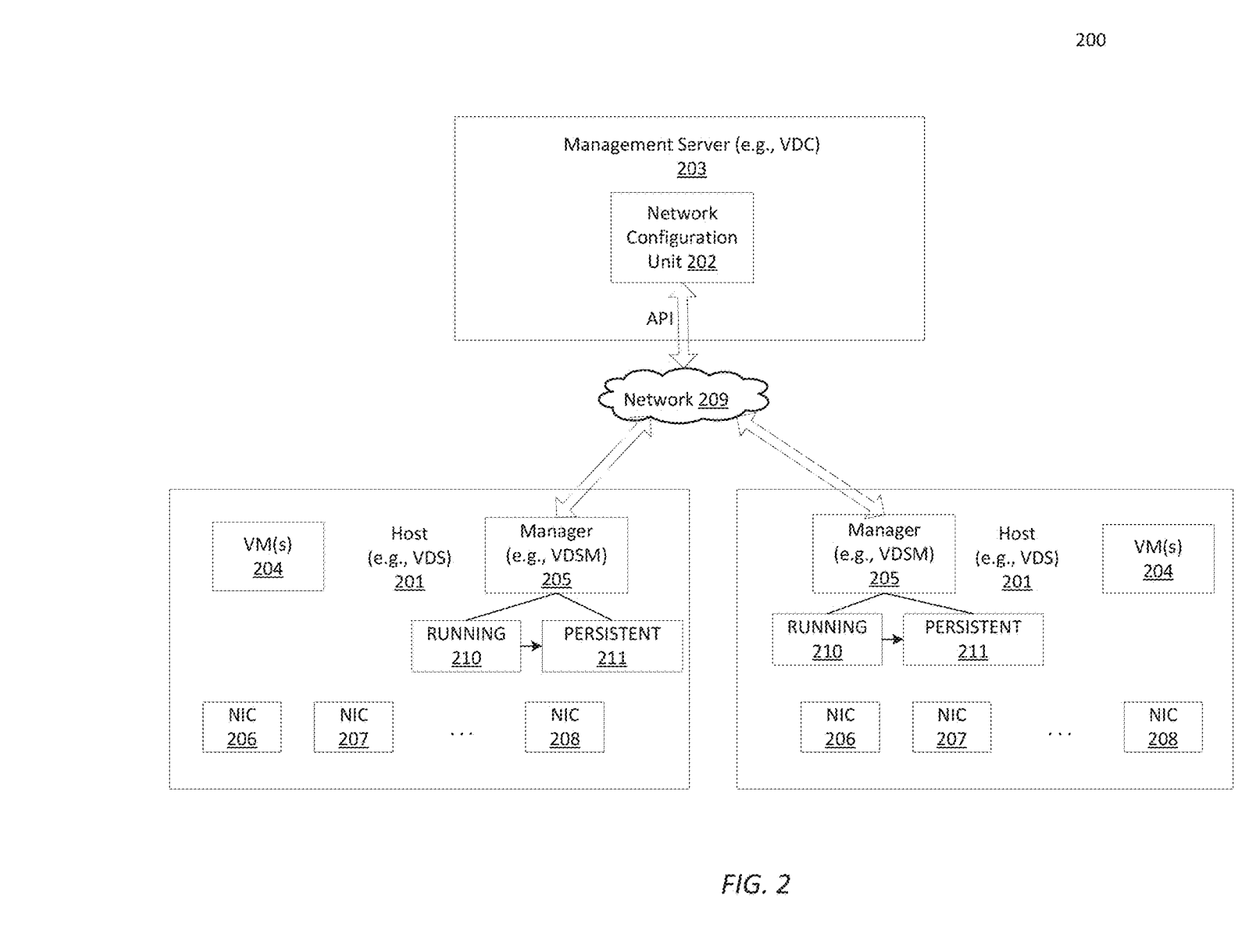
FIG. 2 is a block diagram illustrating a detailed virtualization computing system according to an implementation of the disclosure.

FIG. 2 is a block diagram illustrating a detailed virtualization computing system 200 according to an implementation of the disclosure. For example, hosts 201 may be implemented as part of a cluster associated with server 104 (e.g., VDS) and management server 203 may be implemented as part of server 102 (e.g., VDC) of FIG. 1. Referring to FIG. 2, hosts 201 and management server 203 may be communicatively coupled to each other over network 220. Each of the hosts 201 may include one or more physical network interfaces (also referred to as network interface cards or NICs) and host one or more VMs. In this example, host 201 includes NICs 206-208 and hosts one or more VMs 204. Each NIC may be used by a VM hosted by host 201. Each of the NICs is coupled to one or more networks (or logical networks) and configured at the command of network configuration unit 202 of management server 203. Note that multiple NICs may be coupled to the same or different networks dependent upon a specific network configuration. Similarly, a single NIC may be coupled to multiple networks.

The network configuration of hosts 201 of VM(s) 204 may be achieved by manager (e.g., VDSM manager) 205 under the instruction of network configuration unit 202 of the management server 208. The network configuration unit 202 may issue configuration commands to the manager 205 which may, in turn, configure the network settings for each VM running on hosts 201. In one implementation, network configuration unit 202 may provide an application programming interface (API) (such as VDSM) according to which the commands to configure network of VM(s) are specified.

Implementations of the present disclosure provide for configuration commands to create a first running configuration 210 and a second persistent configuration 211 for host 201 of VMs. The running configuration 210 may be specified by a set of configuration files that include values of networking components (NICs and bonds) that are currently used by the host of VMs. The configuration files of the running configuration 210 may be stored in designated temporary directories (e.g., under a temporary mount point). The configuration files of the running configuration may be lost in the event to a reboot. The persistent configuration 211 may include another set of configuration files that specify values of networking components to be used in the event of a reboot. The configuration files of the persistent configuration are preserved through the reboot. Thus, the persistent configuration may be used to reset the network configurations for hosts of VMs through reboots. Implementations also provide mechanisms to convert a running configuration into a persistent configuration. In one implementation, a conversion command issued by a network configuration unit may cause a VDSM manager on a host to perform an atomic copy (a copy of all or nothing) of the configuration files of the running configuration from the temporary directories to the persistent directories to create a persistent configuration of the host. In this way, a unified and persistent network configuration may be achieved.

Figure 3:
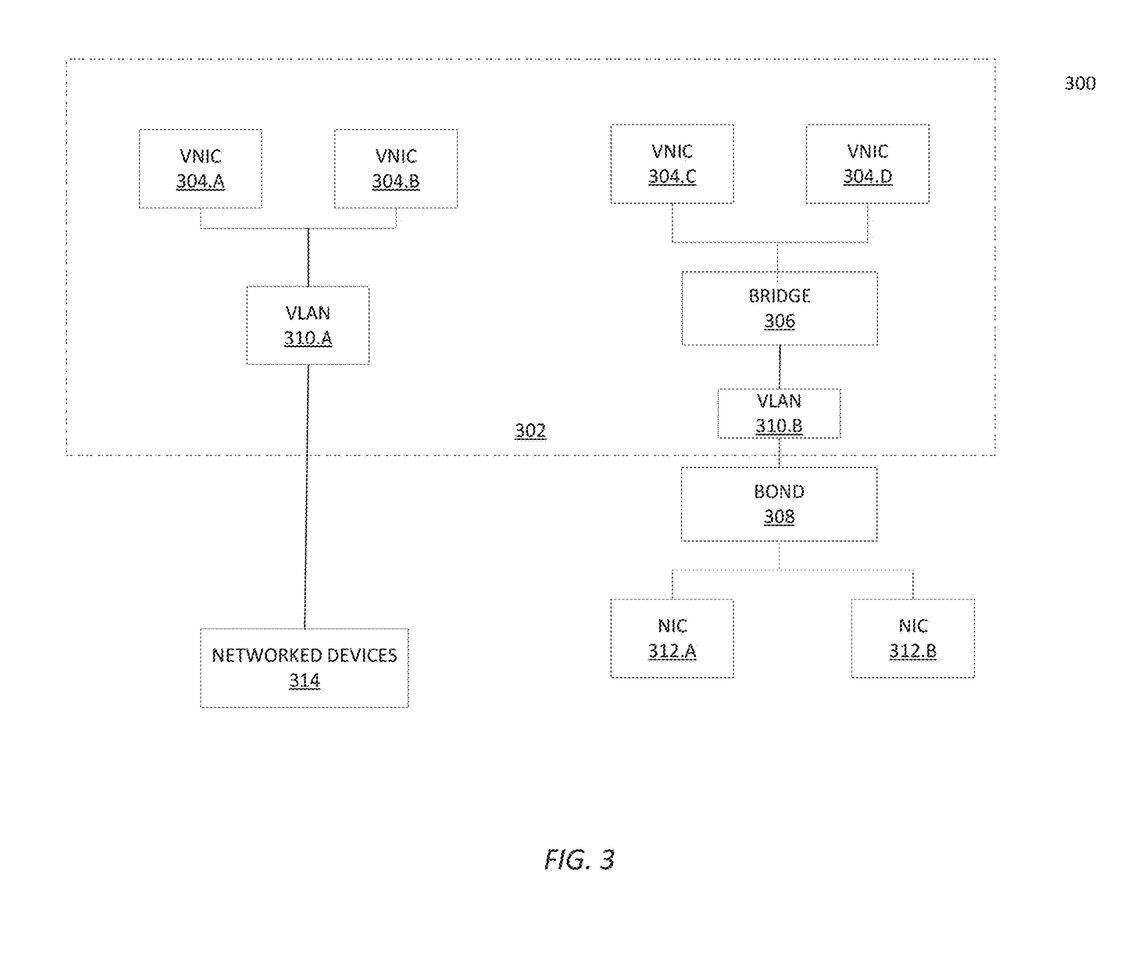
FIG. 3 illustrates an example network configuration of virtual machines according to implementations of the disclosure.

FIG. 3 illustrates an example network configuration 300 of virtual machines according to implementations of the disclosure. FIG. 3 is used only for illustrative purpose. Implementations of the disclosure may include more or fewer than the number of each components shown in FIG. 3. Referring to FIG. 3, a virtual machine 302 may include virtual network components such as virtual network interface cards (VNICs) 304.A through 304.D, bridge 306, bond 308, and virtual LAN (VLAN) 310.A through 310.B. These virtual network components may be configured to run through network interface cards (NICs) 312.A through 312.B or provide interfaces to hardware device 314 (such as storage networks). A network configuration unit 202 as shown in FIG. 2 may issue configuration commands to a manager 205 (such as a VDSM manager) on hosts 201 so that the manager 205 may configure the networking components of hosts 320 of VMs. For the example as shown in FIG. 3, VNICs 304.C through 304.D may be coupled to bridge 306 which may be a software bridge implemented over a physical network (such as a web server network, a deployment network, or a display network). The software bridge 306 may be coupled to a VLAN 310.B to a bond 308. In one implementation, bond 308 may be a bonding driver that aggregates multiple NICs (such as NICs 312.A through 312.B) into a single logical bonded interface. The configuration commands issued by the network configuration unit 202 may specify how the physical networking components (such NICs and networks) interact with virtual networking components.

Similarly, VNICs 304.A through 304.B may be coupled to VLAN 301.A which may provide a networking driver to networked device 314. Similarly, the configuration commands issued by the network configuration unit 202 may specify how the networked devices interact with virtual networking components.

Implementations of the disclosure may include systems and methods that issue configuration commands (executed by VDSM as configurators) that may perform network configurations for hosts of VMs. Implementations may provide unified network configurations that are independent of the particular type of operating system distributions. Thus, network configurations according to implementations are abstracted away from the individualized network persistence approach of initscripts packages. Network configurations are confined to transactions (such as addition or deletion of a network)—namely, if a network configuration transaction fails, it does not affect the network persistence or other network configuration transactions. Implementations may store network configuration files in a file system. In one implementation, network configuration files are stored in Javascript Object Notation (JSON) files, and each network and/or bond may have a corresponding JSON file.

In one implementation, a VDSM manager may receive a command ("setupNetworks") from the configuration unit (e.g., at the direction of a network administrator or a user) of a management server to set up network configurations a host of VM(s). The setupNetworks command may include necessary information for the configuration and may cause a VDSM manager to create configuration files in a temporary file directory (or folder) representing a running configuration. The running configuration may have the following characteristics. First, the running configuration is temporary in the sense that the configuration files of the running configuration are stored in a temporary directory that may be removed in the event that host machines reboot. Further, the running configuration may be dynamically changed (e.g., at the direction of a user) while VM(s) run on hosts so that networks may be added or deleted from VM(s).

In one implementation, the VDSM manager may receive the a setupNetworks command and break the process to set up networks into a series of actions including actions of addNetwork and/or delNetwork (or a combination of addNetwork and delNetwork to achieve editNetwork). The network configuration files of the running configuration may be stored separately in a first sub-directory for network files and a second sub-directory for bond files. The network files include configuration files for all networks, and bond files may include configurations files of all bonds that are maintained, after the execution of the setupNetworks command. For example, if a setupNetworks command adds two networks and edits a third and is followed by another setupNetworks that deletes the first network, network sub-directory of the running configuration contains only configuration files of the second network and the newly edited third network. Similarly, the bond sub-directory of the running configuration may contain configuration files of the maintained bonds after the execution of the setupNetworks command. In one implementation, for Linux operating system, the network sub-directory may be stored at /var/run/vdsm/netconf/nets/, and the bond sub-directory may be stored at /var/run/vdsm/netconf/bonds/, where any sub-directories of /va/run is part of a temporary mount point of the file system that does not contain persistent content.

In one implementation, the running configuration may be used to roll back failed add/delNetwork actions of the SetupNetwork commands. Since the networks that are added or deleted are also known, the newly added or deleted networks may be removed from the running configuration to revert any changes caused by the failed add/delNetwork commands using the setupNetwork command. In this way, no additional backup operations are needed for rollbacks.

In one implementation, the configurators may include a command to make the running configuration a persistent configuration ("setSafeNetworkConfig"). The network configuration unit may issue the setSafeNetworkConfig command to the VDSM manager on hosts to convert the running configuration into a persistent configuration. The setSafeNetworkConfig command may create configuration files in a persistent file directory (or folder) representing the persistent configuration. The permanent file directory may be preserved even in the event that a host reboots. In one implementation, setSafeNetworkConfig command may cause a copy of the running configuration from the temporary directory (and sub-directories) to the persistent directory in which the persistent configuration is stored. In one implementation, the persistent directory may include a network sub-directory: /var/lib/vdsm/persistence/netconf/nets/ and a bond sub-directory: /var/lib/vdsm/persistence/netconf/bonds/. In response to a setSafeNetworkConfig command, the configuration files stored in the temporary directories of /var/run/vdsm/netconf/nets/ and /var/run/vdsm/netconf/bonds/ (and in their respective sub-directories) may be copied respectively to the persistent directories of /var/lib/vdsm/persistence/netconf/nets/ and /var/lib/vdsm/persistence/netconf/bonds/ to establish the persistent configuration.

In one implementation, the copy from temporary directories to the persistent directories is an atomic operation. The atomic operation with respect to one or more configuration files may be accomplished in one logical step to achieve either completely successful copy of all the files or a completely failed attempt, thus preventing partial overwrite of the persistent configuration files. In one implementation, the atomic copy may be accomplished by first copying the running configuration files to intermediate sub-directories rather than overwriting directly over the currently existing persistent files. Once the running configuration is successfully copied to the intermediate sub-directories, the links to the intermediate sub-directories may replace the links to the current persistent configuration so that the intermediate sub-directories become the persistent configurations in a single step.

Thus, hosts of VM(s) according to implementations may include one or more running configurations whose values are stored in temporary sub-directories and a persistent configuration whose values are stored in persistent sub-directories. The running configurations may be created by a setupNetworks command executed by the VDSM manager of hosts, and the persistent configuration may be created by copying or atomically copying files associated with the running configurations to persistent sub-directories.

Figure 4A:
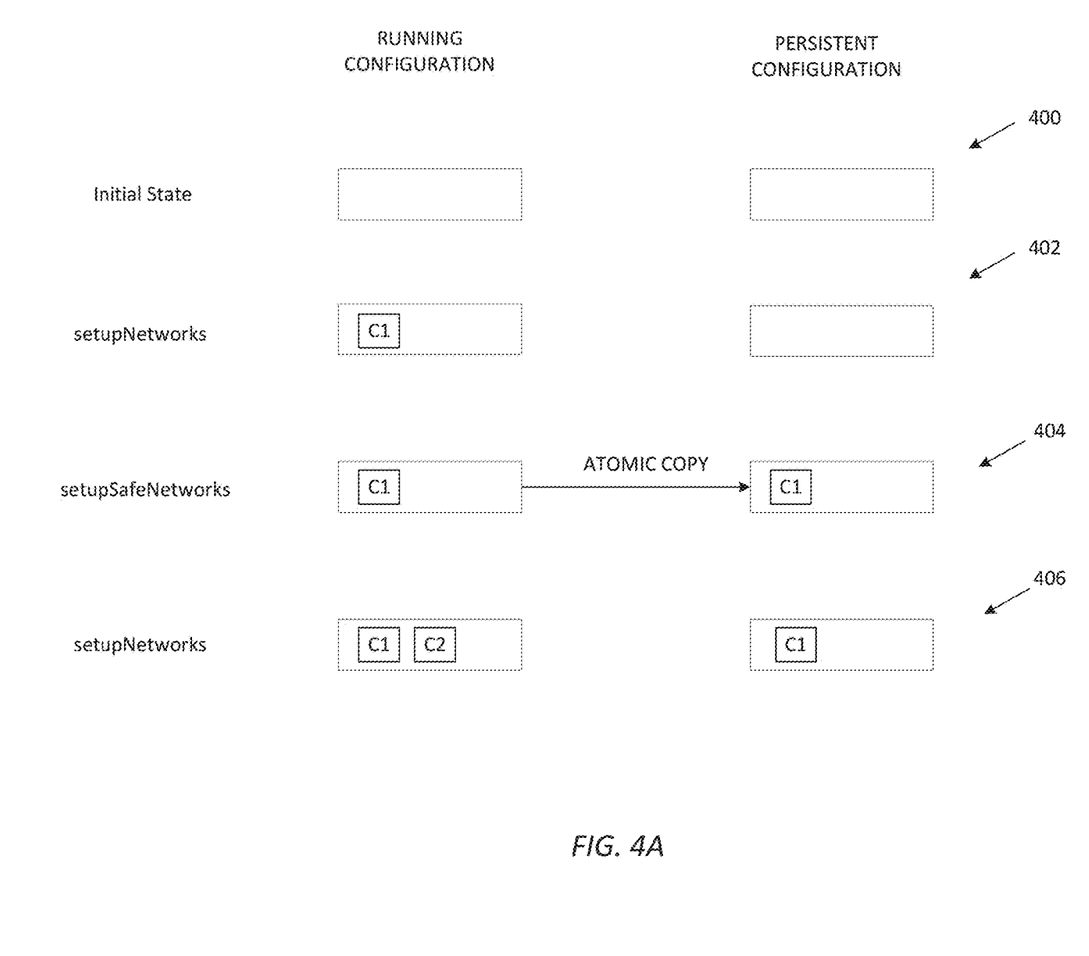
FIGS. 4A-4C illustrate operations to create, reboot, and rollback network configurations according to implementations of the disclosure.
Figure 4B:
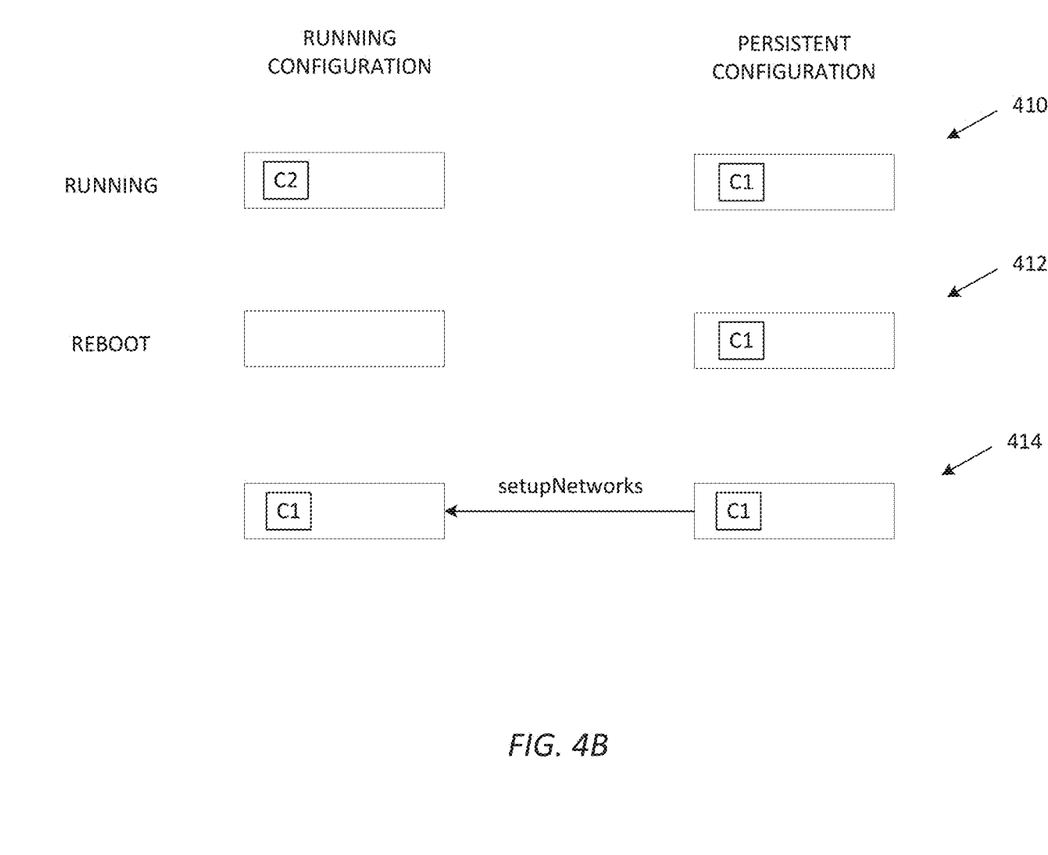
Figure 4C:
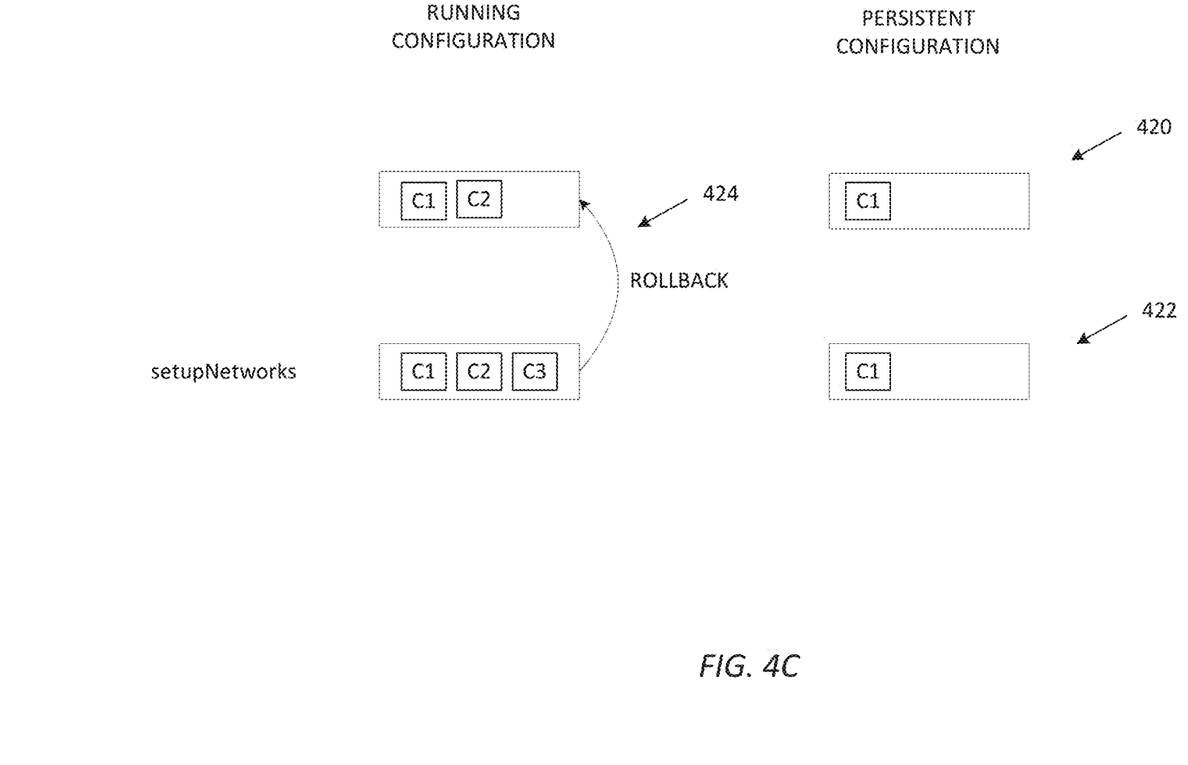

Configuration commands may be executed to perform certain configuration operations. FIGS. 4A-4C illustrate operations to create network configurations, reboot, and rollback according to implementations of the disclosure. FIG. 4A illustrates the operations to create a running configuration and a persistent configuration according to an implementation of the disclosure. Referring to FIG. 4A, at 400, a host is at its initial state before any configuration— namely, the running configuration and the persistent configuration are not set yet. At this stage, the temporary sub-directories to store files of running configurations and the persistent sub-directories to store files of the persistent configuration may be empty. At 402, the VDSM manager of the host may receive a setupNetworks command from a management server. The VDSM manager may execute the setupNetworks command to configure the host with a running configuration and store configuration files C1 of the running configuration in temporary sub-directories. Subsequently, at 404, the VDSM manager may receive a setSafeNetworkConfig configurator. In response to receiving the setSafeNetworkConfig configurator, VDSM manager may convert the running configuration to a persistent configuration by copying configuration files C1 from the temporary sub-directories to persistent sub-directories. In one implementation, the copy operation is an atomic operation which may be performed in one single step. At 406, the VDSM may receive a second setupNetworks command from a management server. The second setupNetworks command may configure the host with a second running configuration and store the associated configuration files C2 of the second running configuration in the temporary sub-directories.

FIG. 4B illustrates the operations to reboot a host according to an implementation of the disclosure. Referring to FIG. 4B, at 410, a host may run VM(s) using a running configuration whose values may be stored in configuration files C2 in temporary sub-directories. Concurrently, the host may include a persistent configuration whose values may be stored in configuration files C1 stored in persistent sub-directories. In the event that the host reboots, at 412, the temporary sub-directories in which the configuration files of running configurations are stored may be removed. However, persistent configuration files C1 stay in persistent sub-directories. At 414, still in the reboot process, the VDSM manager of the host may execute a setupNetworks command that may create a running configuration using the persistent configuration files C1 stored in persistent sub-directories. The setupNetworks command may also create running configuration files C1 in the temporary sub-directories.

FIG. 4C illustrates the operations to roll back a host according to an implementation of the disclosure. Referring to FIG. 4C, at 420, the network of a host may be configured according to running configuration files C1, C2, and concurrently, the host may have persistent configuration files C1. At 422, the VDSM manager of the host may receive another setupNetworks command to set up an additional running configuration according to configuration files C3. After the attempt to set up, it may be determined that the latest running configuration (C3) failed. At 424, the running configurations may roll back to a state prior to the addition of C3. The rollback may be achieved by a setupNetworks command that removes configuration files of the last added networks and bonds, and adds the configuration files of the last deleted networks and bonds to restore the running configurations (C1, C2).

Figure 5:
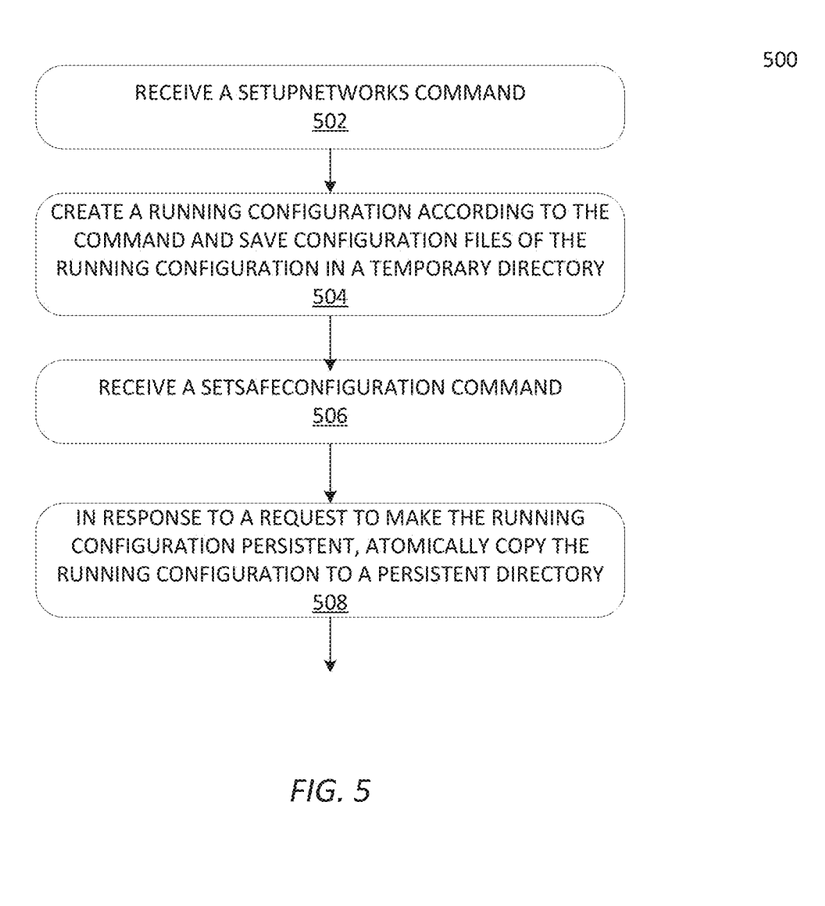
FIG. 5 shows a flow diagram illustrating an example of a method to configure hosts of virtual machines with running and persistent configurations according to implementations of the disclosure.

FIG. 5 shows a flow diagram illustrating an example of a method 500 to configure networks for hosts of virtual machines with running and persistent configurations according to implementations of the present disclosure. Method 500 may be performed by a processing logic that may include hardware (e.g., circuitry, dedicated logic, programmable logic, microcode, etc.), software (e.g., instructions run on a processing device to perform hardware simulation), or a combination thereof. In one example, method 500 may be performed by the VDSM manager 204 of hosts as shown in FIG. 2.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 5, at 502, a VDSM manager of hosts may receive, from a management server, a setupNetworks command. The setupNetworks command may be a data file written according to an application programming interface (API) protocol containing parametric specifications for network components (such as NICs and bonds) according to which virtual network components may interact with network components.

At 504, the VDSM manager may execute the received setupNetworks command to create a running configuration. In one implementation, the running configuration may be built in memory from existing running configuration files stored in the temporary sub-directories and the network updates contained in the setupNetworks command. The existing running configuration and the updates may be combined to create a current running configuration. Values of the current running configurations may be stored in configuration files in the temporary sub-directories. The temporary sub-directories may be transient in the sense that they may be reset to empty in the event of host reboot. The temporary sub-directories may include a directory to store network files and a directory to store bond configuration files.

At 506, the VDSM manager may receive, from the management server, another command (setSafeNetworkConfig) to convert the current running configuration into a persistent configuration. In response to receiving the setSafeConfig command, at 508, the VDSM manager may execute an atomic copy operation to copy value files of the running configurations from the temporary sub-directories to persistent directories. The value files stored in the persistent sub-directories may represent a persistent configuration that may be retrieved after a host reboot.

Figure 6:
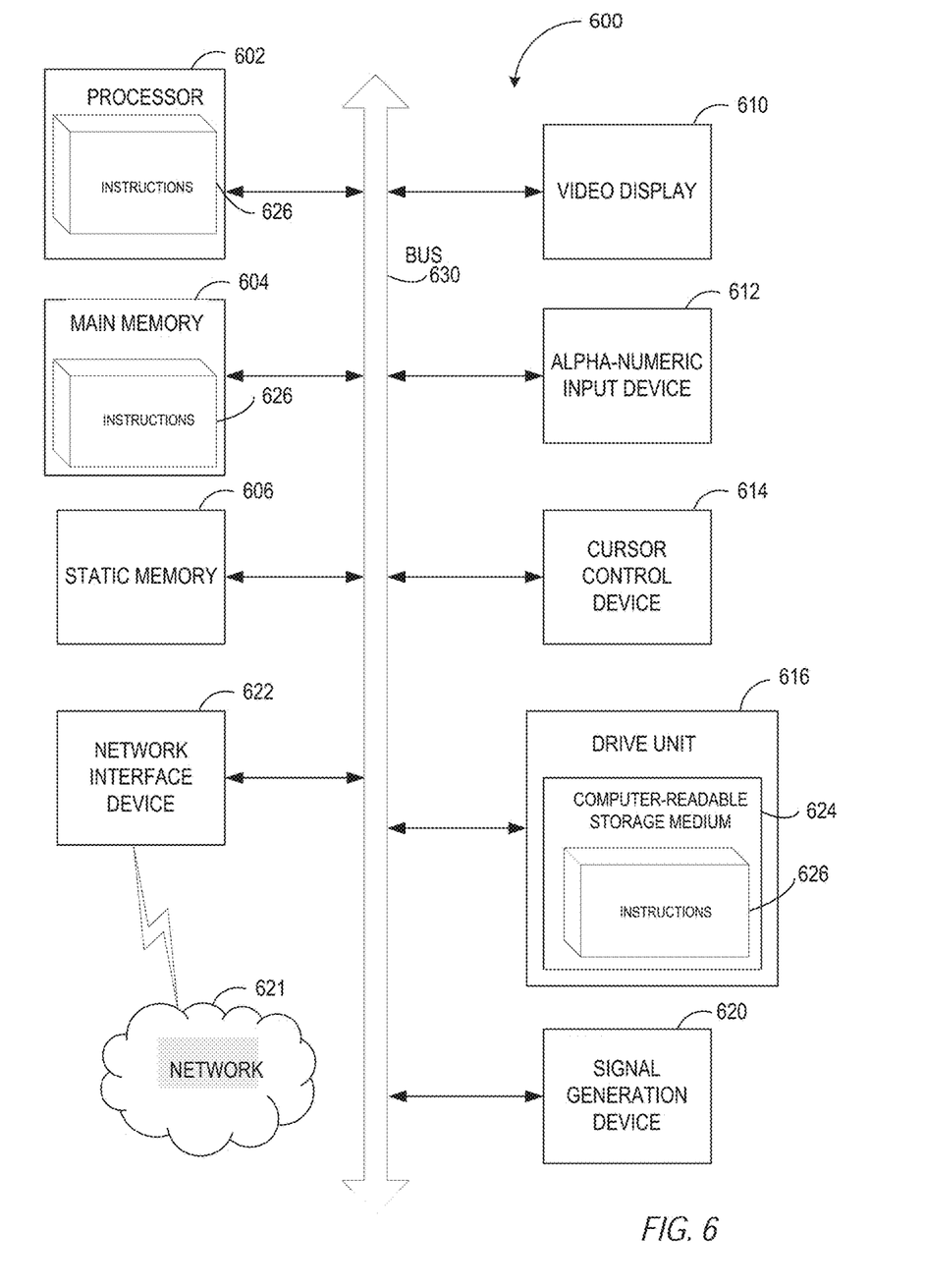
FIG. 6 shows a diagrammatic representation of a machine in the form of a computer system, in accordance with one example.

FIG. 6 depicts a diagrammatic representation of a machine in the form of a computer system 600 within which a set of memory instructions 626, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processor 602 (e.g., a processing device), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the operations for the core dump-level stack trace subsystem 120 for performing steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the core dump-level stack trace subsystem 120) for the computer system 100 representing any one or more of the methodologies or functions described herein. The instructions 626 for the computer system 100 may also reside, completely or at least partially, within the main memory 604 and/or within the processor 602 during execution thereof by the computer system 600, the main memory 604 and the processing device 602 also constituting computer-readable storage media. The instructions 626 for the computer system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving a first command to create a first running configuration associated with a host computer executing a virtual machine;
   in response to receiving the first command, generating a first configuration file comprising the first running configuration associated with the host computer executing the virtual machine;
   storing the first configuration file in a temporary directory associated with the host computer;
   receiving a second command to make the first running configuration persistent over a reboot of the host computer;
   in response to receiving the second command, executing an atomic copy of the first configuration file from the temporary directory to a persistent directory associated with the host computer;
   executing the third command to create a second running configuration for the host computer;
   storing the second running configuration in a second configuration file in the temporary directory; and
   responsive to detecting a rollback event relating to the second running configuration, reverting the second running configuration back to the running configuration using the first configuration file stored in the temporary directory.

2. The method of claim 1, further comprising:
   in response to detecting a reboot of the host computer, executing a fourth command to set up a network configuration of the host computer using the first configuration file stored in persistent directory.

3. The method of claim 1, further comprising:
   receiving the third command to set up network configurations for the host computer.

4. The method of claim 1, further comprising:
   responsive to detecting a second rollback event relating to the first running configuration, reverting the first running configuration back to the running configuration using the first configuration file stored in the persistent directory.

5. The method of claim 1, wherein the first configuration file of the first running configuration comprise an address and an identifier of a networking component of the host computer.

6. The method of claim 1, further comprises:
   building the first running configuration in a memory associated with the host computer from the first configuration file stored in the temporary directory and from data indicating networking changes received in the first command; and
   storing the built first running configuration in the temporary directory.

7. The method of claim 1, wherein the atomic copy is an atomic operation with respect to the first configuration file.

8. An apparatus comprising:
   a storage device; and
   a processing device, communicably coupled to the storage device, to:
      receive a first command to create a first running configuration associated with a host computer executing a virtual machine;
      in response to receiving the first command, generate a first configuration file comprising the first running configuration associated with the host computer executing the virtual machine;
      store the first configuration file in a temporary directory associated with the host computer;
      receive a second command to make the running configuration persistent over a reboot of the host computer;
      in response to receiving the second command, execute an atomic copy of the first configuration file from the temporary directory to a persistent directory associated with the processing device;
      execute the third command to create a second running configuration for the host computer;
      store the second running configuration in a second configuration file in the temporary directory; and
      responsive to detecting a rollback event relating to the second running configuration, revert the second running configuration back to the running configuration using the first configuration file stored in the temporary directory.

9. The apparatus of claim 8, wherein the processing device is further to:
   in response to detecting a reboot of the processing device, execute a fourth command to set up a network configuration of the processing device using the first configuration file stored in persistent directory.

10. The apparatus of claim 8, wherein the processing device is further to:
    receive the third command to set up network configurations for the processing device.

11. The apparatus of claim 8, wherein responsive to detecting a second rollback event relating to the first running configuration, the processing device is further to
    revert the first running configuration back to the running configuration using the first configuration file stored in the persistent directory.

12. The apparatus of claim 8, wherein the first configuration file of the first running configuration comprise an address and an identifier of a networking component of the processing device.

13. The apparatus of claim 8, further comprising:
    building the first running configuration in a memory associated with the processing device from the first configuration file stored in the temporary directory and from data indicating networking changes received in the first command; and
    store the built first running configuration in the temporary directory.

14. The apparatus of claim 8, wherein the atomic copy is an atomic operation with respect to the first configuration file.

15. A non-transitory computer readable storage medium comprising instructions that, when executed by a processing device of a host computer, cause the processing device of the host computer to:
- receive a first command to create a first running configuration associated with a host computer executing a virtual machine;
- in response receiving the first command, generate a first configuration file comprising the first running configuration associated with the host computer executing the virtual machine;
- store, by the processing device, the first configuration file in a temporary directory associated with the host computer;
- receive a second command to make the running configuration persistent over a reboot of the host computer;
- in response to receiving the second command, execute an atomic copy of the first configuration file from the temporary directory to a persistent directory associated with the host computer;
- execute the third command to create a second running configuration for the host computer;
- store the second running configuration in a second configuration file in the temporary directory; and
- responsive to detecting a rollback event relating to the second running configuration, revert the second running configuration back to the running configuration using the first configuration file stored in the temporary directory.

16. The non-transitory computer readable storage medium of claim 15, wherein the processing device is further to:
- in response to detecting a reboot of the host computer, execute a fourth command to set up a network configuration of the host computer using the first configuration file stored in persistent directory.

17. The non-transitory computer readable storage medium of claim 15, wherein the processing device is further to:
- receive the third command to set up network configurations for the host computer.

18. The non-transitory computer readable storage medium of claim 15, wherein the first configuration file of the first running configuration comprise an address and an identifier of a networking component of the host computer.

19. The non-transitory computer readable storage medium of claim 15, wherein the operations further comprise:
- building the first running configuration in a memory associated with the host computer from the first configuration file stored in the temporary directory and from data indicating networking changes received in the first command; and
- store the built first running configuration in the temporary directory.

20. The non-transitory computer readable storage medium of claim 15, wherein the atomic copy is an atomic operation with respect to the first configuration file.

* * * * *